Figure 1:
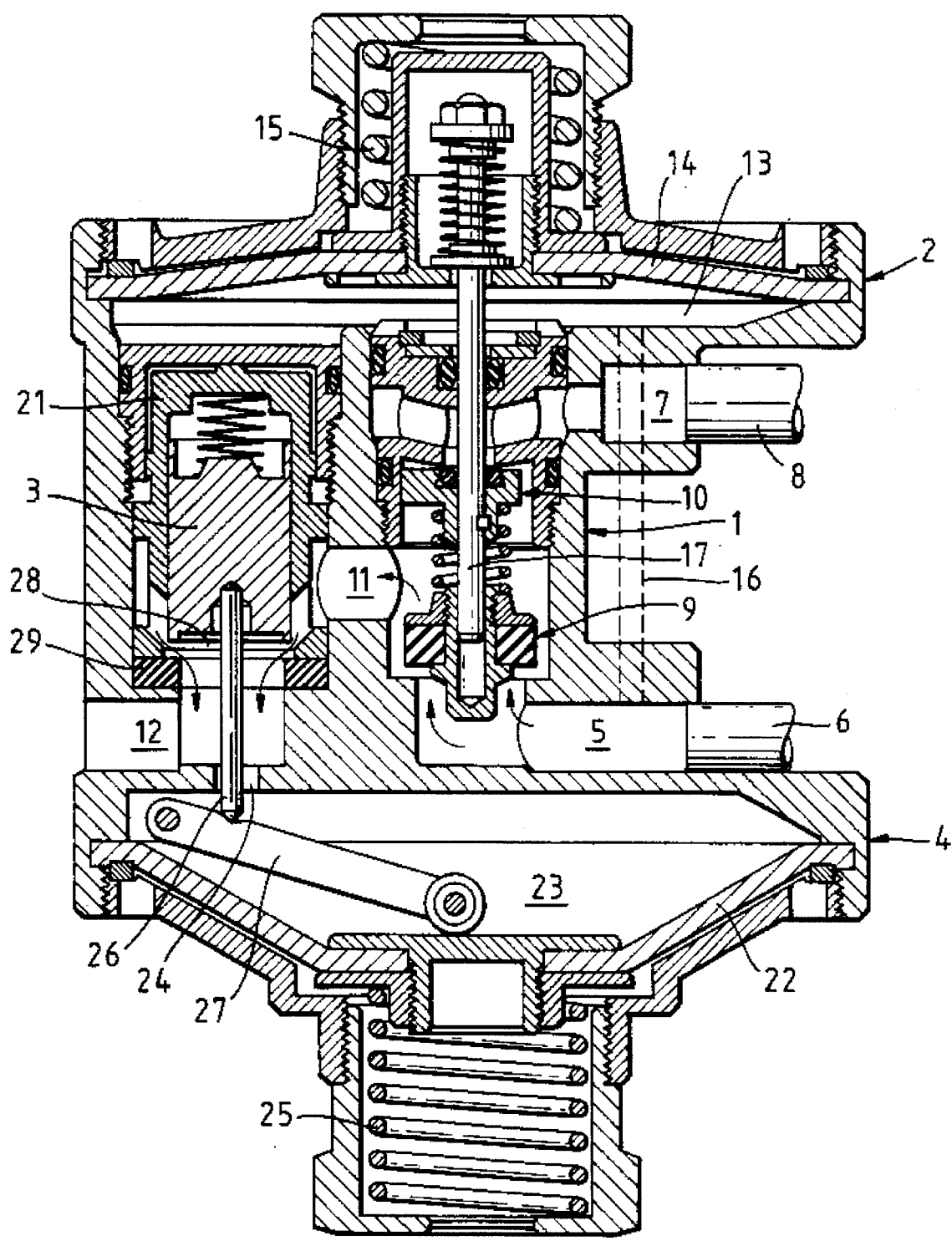

United States Patent [19]

Ottestad

[11] Patent Number: 5,542,417
[45] Date of Patent: Aug. 6, 1996

[54] PRESSURE REGULATING UNIT FOR SUPPLYING A PRESSURIZED FLUID FROM ALTERNATIVE SUPPLY LINES

[75] Inventor: Nils T. Ottestad, Tonsberg, Norway

[73] Assignee: Ottestad Breathing Systems AS, Husoysund, Norway

[21] Appl. No.: 199,160

[22] PCT Filed: Aug. 28, 1992

[86] PCT No.: PCT/NO92/00136

§ 371 Date: Apr. 26, 1994

§ 102(e) Date: Apr. 26, 1994

[87] PCT Pub. No.: WO93/04737

PCT Pub. Date: Mar. 18, 1993

[30] Foreign Application Priority Data

Aug. 29, 1991 [NO] Norway .................. 913393

[51] Int. Cl.[6] ................................. A61M 16/20
[52] U.S. Cl. ................. 128/205.24; 128/204.29; 128/204.22; 137/113
[58] Field of Search ............ 128/205.24, 204.22, 128/204.26, 204.27, 204.29; 137/625.5, 113

[56] References Cited

U.S. PATENT DOCUMENTS

| 2,354,286 | 7/1944 | Whaley | 137/113 |
|---|---|---|---|
| 2,775,980 | 1/1957 | Renaudie | 137/113 |
| 4,354,518 | 10/1982 | Kuroda et al. | 137/112 |
| 4,674,526 | 6/1987 | Athanassiu | 137/113 |
| 4,739,790 | 4/1988 | Clarke | 128/205.24 |
| 5,183,072 | 2/1993 | Pengler | 137/113 |

FOREIGN PATENT DOCUMENTS

| 0125447 | 11/1984 | European Pat. Off. . | |
| 1099294 | 2/1961 | Germany | 137/113 |

Primary Examiner—Edgar S. Burr
Assistant Examiner—William J. Deane, Jr.
Attorney, Agent, or Firm—Marshall, O'Toole, Gerstein, Murray & Borun

[57] ABSTRACT

A pressure regulating unit for supplying a pressurized fluid, especially breathing gas, to a user, which unit comprises a pressure regulator (3, 22–29) and a switching means (1, 9, 10, 13–20) for controlling the fluid supply from a preferential supply line (6) and an alternative supply line (8) to a common outlet (12) from the unit. The unit comprises a first chamber (13) which is in open connection (16) with the preferential supply line (6), and which contains a spring-actuated first sensing diaphragm (14) sensing the pressure in the preferential line (6) and being operatively connected to and driving the valve means (9, 10, 17–20). This is designed so that it keeps the preferential line (6) connected to an outlet chamber (11) and the alternative line (8) shut-off as long as the pressure in the preferential line (6) is sufficient to maintain a desired outlet pressure from the unit, but connects the alternative line (8) to the outlet chamber (11) and shuts off the preferential line (6) when the pressure therein drops below a certain value. Further, the unit includes a pressure regulator which sees that the pressure at the outlet (12) of the unit is kept stable on the desired outlet pressure.

5 Claims, 2 Drawing Sheets

PRESSURE REGULATING UNIT FOR SUPPLYING A PRESSURIZED FLUID FROM ALTERNATIVE SUPPLY LINES

The invention relates to a pressure regulating unit for supplying a pressurized fluid, especially breathing gas, to a user, which unit comprises a pressure regulator and a switching means for controlling the fluid supply from a preferential supply line and an alternative supply line to a common outlet from the unit, the switching means including a valve means arranged to connect either of the two supply lines to the outlet in dependence on the pressure in the supply lines.

Such a device is intended for use in situations wherein it is necessary to maintain a stable outlet pressure from the unit even if the supply through the .preferential supply line disappears for shorter periods. A topical example is in connection with the breathing gas supply to a combat plane pilot. In some situations, such as when starting and in combat situations, the pressure energy from the compressor of the airplane is used to drive the plane and the equipment thereof, so that one does not have the necessary pressure for air supply to the pilot. The combat plane pilots therefore have an alternative breathing gas source, consisting of liquid pressurized oxygen, which is connected to an alternative supply line. This alternative source constitutes an emergency reservoir which—mainly because of space limitations—has a relatively small capacity. It is therefore essential that this emergency reservoir is used as little as possible.

From U.S. Pat. No. 2,775,980 there is known a pressure regulating unit wherein a switching means controls gas supply from a pair of supply lines to a common outlet. The supply lines are connected through respective pressure regulators to separate high pressure sources of which each consists of a battery of high pressure gas bottles. The unit is designed for automatically and without any discontinuity to ensure the supply from the two supply lines to the common outlet in a predetermined order, the stand-by line being gradually connected and completely takes over the gas supply to the outlet only when the pressure in the supply line being drained has dropped below a predetermined critical value. The switching means comprises a valve housing having a pair of interconnected spring-influenced diaphragms which cooperate with respective valve seats on opposite sides of the valve housing, and which define respective chambers communicating with a respective high pressure source. Further, there is provided a spring-controlling means for influencing the springs so that one spring applies a greater thrust than the other, so that a greater thrust is applied to the diaphragm assembly alternately in one direction and the other. Thereby one supply line may have priority over the other, so that the preferential line is maintained connected until the pressure drops below the critical value. At that time this line is disconnected, whereas the other line then is completely connected and takes over the gas supply. Thereafter the spring-force controlling means is switched over, so that the now connected second line takes priority while its high pressure source is drained until the pressure thereof has dropped to the critical value.

This device makes it possible to replace a drained gas bottle battery with a fresh battery without the gas supply being disturbed, and without any switching of the pressure regulator of the unit being required. However, the device is intended for alternating draining of high pressure sources until the pressure of the utilized source has dropped to a certain value, and thus is not suitable for the application stated in the introduction.

Thus it is an object of the invention to provide a pressure regulating unit having a switching means which at any time senses the pressure in the preferential supply line, and which gives priority to supply through this line, so that the alternative supply line is used as little as possible. Simultaneously, it is an object of the invention to provide such a unit which sees that the pressure at the outlet of the unit is maintained stable at a desired level.

The above-mentioned objects are achieved with a pressure regulating unit of the introductorily stated type which, according to the invention, is characterized in that it comprises a first chamber which is in open connection with the preferential supply line, and which contains a spring-actuated first sensing diaphragm sensing the pressure in the preferential line and being operatively connected to and driving the valve means, so that it keeps the preferential line connected to an outlet chamber and the alternative line shut-off as long as the pressure in the preferential line is sufficient to maintain a desired outlet pressure from the unit, but connects the alternative line to the outlet chamber and shuts off the preferential line when the pressure therein drops below a certain value, and a second chamber which is in open connection with the outlet of the unit, and which contains a spring-actuated second sensing diaphragm which is operatively connected to a regulator element for control of the fluid flow from said outlet chamber to the outlet of the unit, so that the pressure at the outlet is kept stable on the desired outlet pressure determined by the spring force on said diaphragm.

Figure 2:
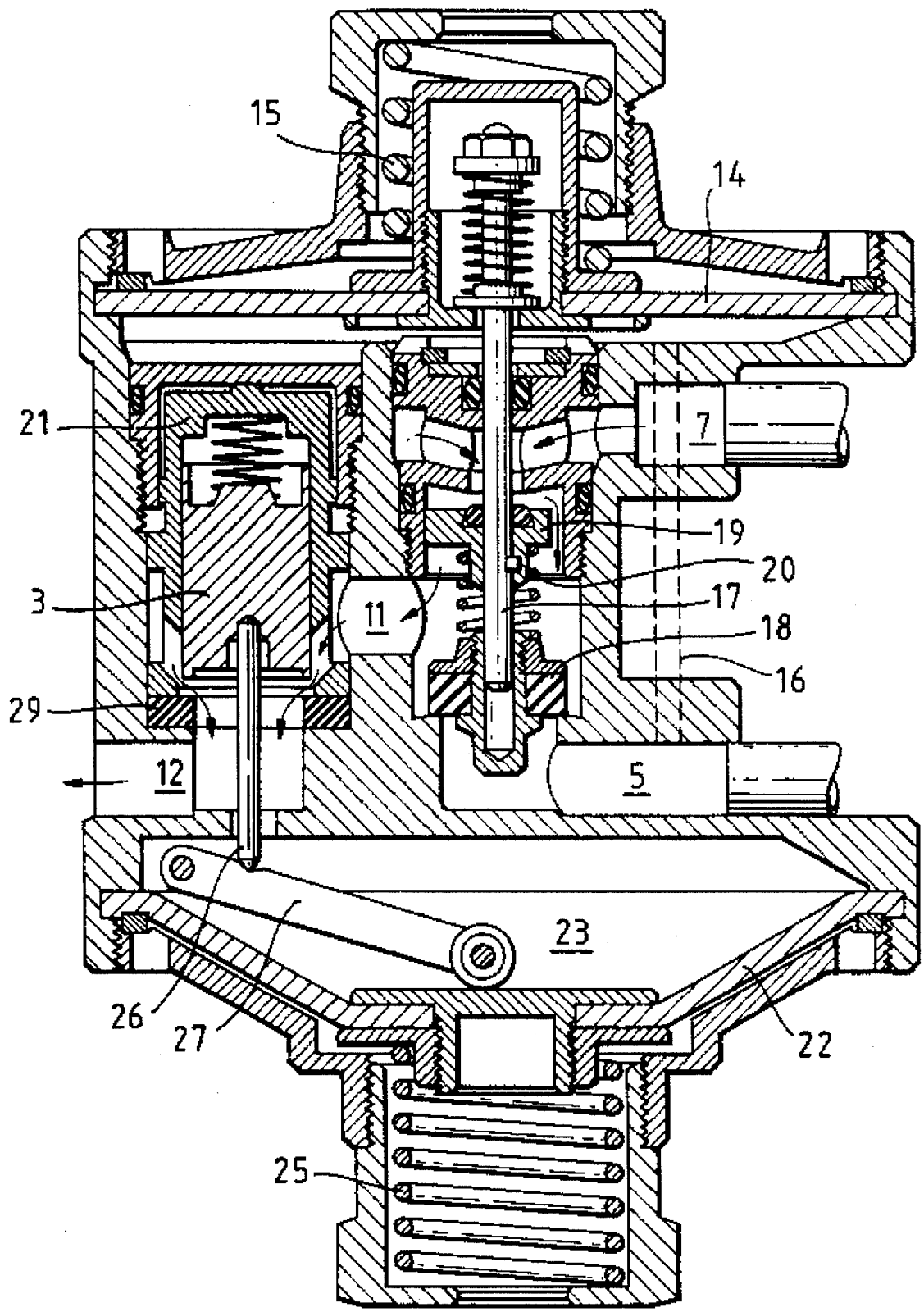

The invention will be further described below in connection with an exemplary embodiment with reference to the drawing, wherein FIG. 1 shows a sectional view of a pressure regulating unit according to the invention in a first operational condition; and FIG. 2 shows a corresponding sectional view of the same unit in a second operational condition.

The device shown in the drawing constitutes an integrated pressure regulator and switching means, wherein the switching means essentially comprises a valve housing 1 (with an associated valve structure) and a first diaphragm housing 2 in association therewith, and the regulator comprises a regulator element 3 in association with a second diaphragm housing 4. As shown, the two diaphragm housings 2, 4 are disposed at opposite sides of the valve housing 1, this giving a compact and simple construction of the unit in association with the remaining components.

The valve housing 1 has a first inlet 5 to which a first, preferential supply line 6 is connected, and a second inlet 7 to which a second, alternative supply line 8 is connected. The two inlets 5, 7 are connected through respective valves 9, 10 (to be further described later) to a common valve or outlet chamber 11 which is connected through the regulator to a common outlet 12 from the unit.

The first diaphragm housing 2 defines a first chamber 13 in which a first sensing diaphragm 14 is mounted in the shown manner, the diaphragm being clamped at its periphery and in its central area being actuated by a force-exerting means in the form of a spring 15 pressing the diaphragm 14 with an adjustable force in the direction towards the chamber 13. Through a channel 16 (only suggested with dashed lines) the chamber 13 is in open connection with the inlet 5 from the preferential supply line 6, so that the diaphragm 14 at any time senses and is influenced by the pressure in this line.

As shown, the diaphragm 14 in its central area is connected to an operating rod 17 which is displaceably arranged in the valve housing 1 and on which there is mounted a first and a second valve body 18 and 19, respectively, forming part of a respective one of the two aforementioned valves 9 and 10 controlling the connection between the respective supply lines 6, 8 and the common outlet chamber 11. The valve body 18 is displaceable on the operating rod 17 and is force-influenced in the direction towards the associated valve seat by means of a spring 20, so that the valve 9 is a one-way valve. The valve body 19 is fixedly mounted on the rod 17 at a suitable position for closing the valve 9 when the valve 10 is opened with displacement of the rod when the pressure in the preferential supply line 6 drops below a certain value.

In the pressure regulator forming part of the unit, the regulator element 3 in the illustrated embodiment is in the form of a spring-loaded piston which is slidable in a cylinder guide 21 which is shown to be placed in a part of the valve housing 1. The piston 3 is operatively connected to a second sensing diaphragm 22 which is mounted in the shown manner in a second chamber 23 which is defined by the second diaphragm housing 4 and through a passage 24 is in open connection with the outlet 12 of the unit.

In a manner corresponding to that of the first sensing diaphragm 14 the second sensing diaphragm 22 is clamped at its periphery, and in its central area it is influenced by a spring 25 which, with an adjustable force, actuates the diaphragm in the direction towards the chamber 23. The piston 3 is connected to the central area of the diaphragm 22 through a connecting rod 26 extending through the passage 24, and a lever 27.

Between the outlet chamber 11 of the valve means and the outlet 12 of the unit there is provided a flow passage 28 which is defined by one end of the piston 3 facing the diaphragm 22, and an annular seat 29. The size of this passage is controlled by the piston 3 in cooperation with the sensing diaphragm 22. Since the chamber 23 is in open connection with the outlet 12, varying pressure at the outlet, and consequently in the chamber 23, will result in that the piston controls the flow passage 28 correspondingly, so that a stable outlet pressure is maintained, the spring force on the diaphragm 22 being adapted for this purpose.

The illustrated embodiment of the pressure regulator only represents an example, since other embodiments may be of interest, such as will be clear to a person skilled in the art.

The operation of the unit broadly will be clear from the preceding description. In the situation in FIG. 1, the fluid supply takes place through the preferential supply line 6. The fluid flow passes the one-way valve 9 and through the outlet chamber 11 and the passage 28 to the outlet 12, as shown by arrows. The position of the piston 3 relative to the seat 29, and therewith the fluid flow to the outlet 12, is controlled by the spring-loaded diaphragm 22 the movement of which actuates the piston through the lever 27 and the rod 26. Since the chamber 23 is in open connection with the outlet 12, the fluid flow past the piston is regulated automatically, so that the pressure is maintained stable at the pressure required to balance the force from the spring 25.

FIG. 2 shows the situation with supply through the alternative supply line 28. In this situation the pressure at the inlet 5, and consequently in the chamber 13, is too low to balance the force from the spring 15. The sensing diaphragm 14 and the operating rod 17 then are pressed downwards, and the valve body 19 opens the passage between the alternative line 8 and the chamber 11. The pressure in the chamber 11 consequently becomes higher than at the inlet 5 of the preferential line, and the one-way valve 9 is kept closed. When the pressure in the preferential line again increases to the desired value, the sensing diaphragm 14 is pressed upwards, so that the valve body 19 again closes the passage between the alternative line 8 and the outlet chamber 11. The situation is then again as shown in FIG. 1.

I claim:

1. A pressure regulating unit for supplying a pressurized fluid, such as breathing gas, to a user from one of a preferential supply line and an alternative supply line, said pressure regulating unit comprising:

switching means for controlling fluid supply from one of the preferential supply line and the alternative supply line to a common outlet, said switching means comprising valve means connecting one of the preferential supply line and the alternative supply to said common outlet in dependence on a pressure in the preferential supply line, and a pressure regulator controlling fluid flow to said common outlet so as to maintain stable fluid pressure at said common outlet at a desired pressure level, said switching means further comprising a first chamber connected to the preferential supply line by a channel, and a spring-actuated first sensing diaphragm sensing the pressure in the preferential supply line and being operatively connected to and driving said valve means, said valve means comprising first and second valves connecting the preferential supply line to an outlet chamber, said first and second valves keeping the alternative supply line shut off as long as the pressure in the preferential line is above said desired pressure level and thus always giving priority to fluid flow through the preferential supply line, said first and second valves also connecting the alternative supply line to said outlet chamber and keeping the preferential supply line shut off when the pressure therein drops below said desired pressure level, said pressure regulator comprising a second chamber connected to said common outlet by a passage, said pressure regulator further comprising a spring-actuated second sensing diaphragm sensing fluid pressure at said common outlet and being operatively connected to a regulator element controlling the fluid flow from said outlet chamber to said common outlet so that the fluid pressure at the common outlet is maintained at said desired pressure level.

2. The pressure regulating unit of claim 1 wherein an operative connection between said first sensing diaphragm and said first and second valves comprises a longitudinally displaceable operating rod attached to a central area of said first sensing diaphragm and on which there is mounted a valve body of each of said valves, the valve bodies controlling the connection between the preferential and alternative supply lines and said outlet chamber.

3. The pressure regulating unit of claim 1 wherein said valve between said preferential supply line and said outlet chamber is a one-way valve.

4. The pressure regulating unit of claim 1, wherein said valves and said regulator element are disposed in a common housing, and said first and second chambers are disposed at opposite sides of said housing.

5. The pressure regulating unit of claim 1 wherein said regulator element is a spring-loaded piston which is slidable in a cylinder guide and is operatively connected to said second sensing diaphragm through a lever means, a fluid flow passage between said outlet chamber and said common outlet being formed between an end of the spring-loaded piston facing said second sensing diaphragm and an annular seat for said piston end.

* * * * *